Jan. 13, 1970     D. N. GARVER ETAL     3,489,108
METHOD OF AND APPARATUS FOR SLUDGE DISPOSAL
Filed Sept. 20, 1967     2 Sheets-Sheet 1
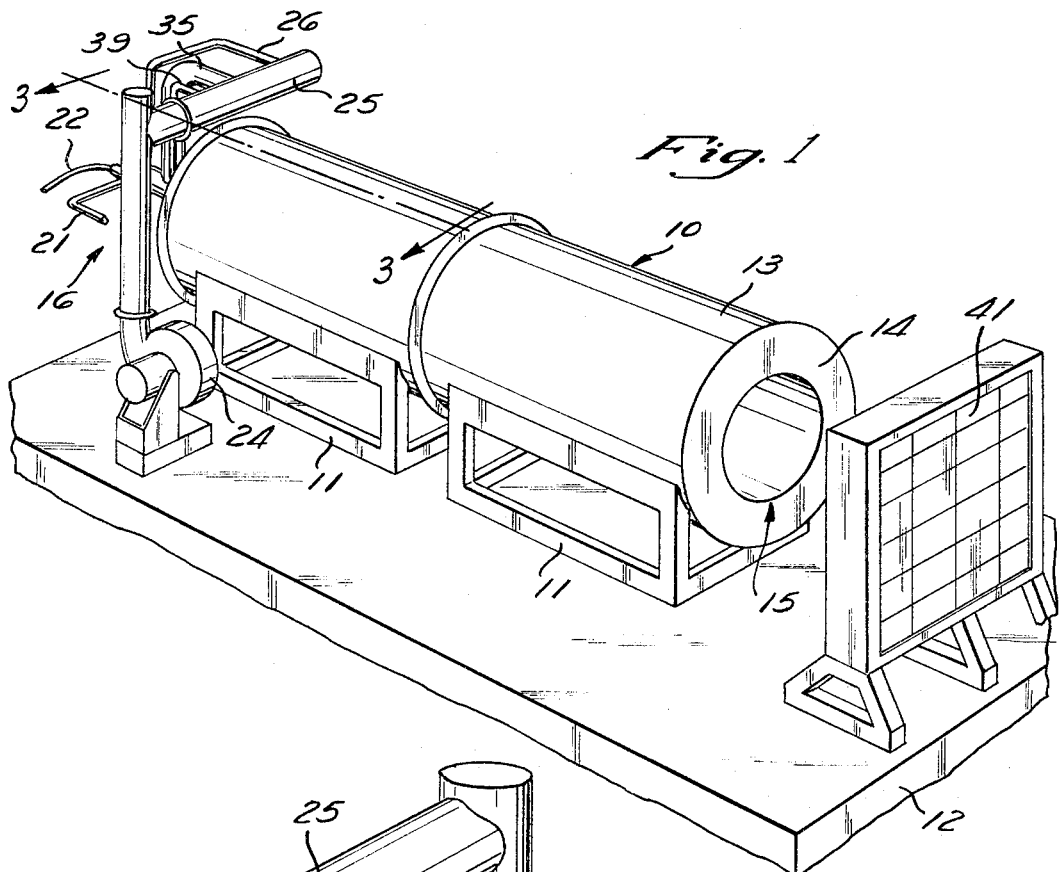
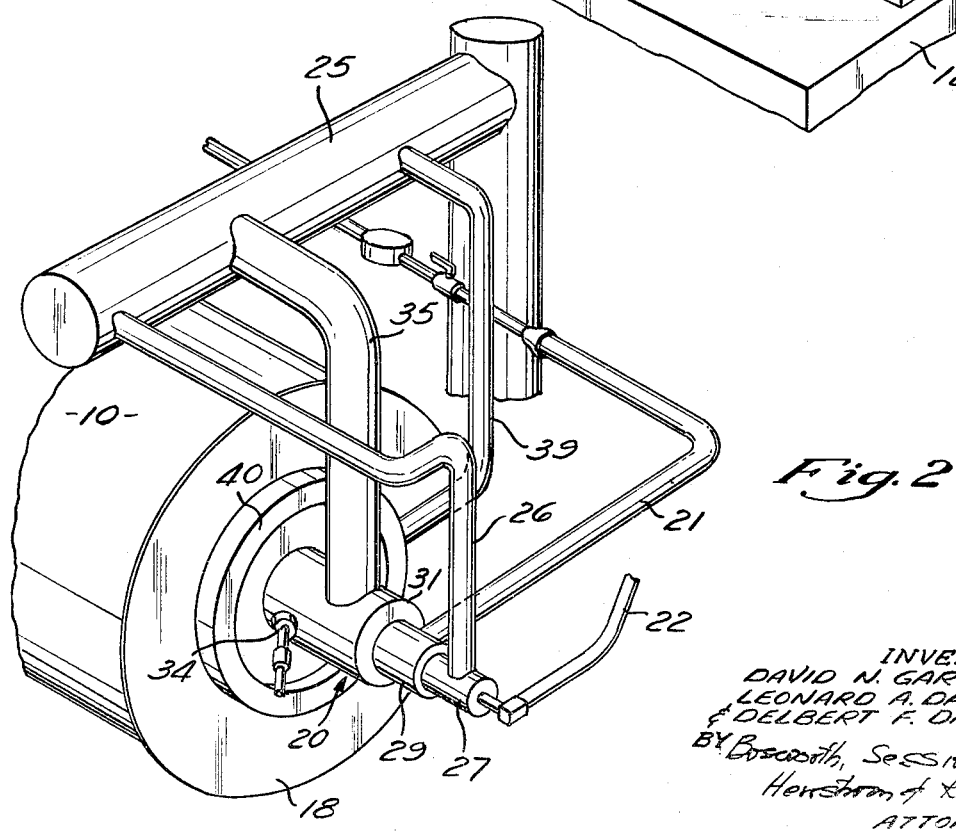
INVENTORS
DAVID N. GARVER,
LEONARD A. DAVIS,
& DELBERT F. DAVIS
BY Bosworth, Sessions,
Herstrom & Knowles
ATTORNEYS INVENTORS
DAVID N. GARVER,
LEONARD A. DAVIS,
& DELBERT F. DAVIS
BY Bosworth, Sessions,
Herstrom & Knowles
ATTORNEYS

United States Patent Office

3,489,108
Patented Jan. 13, 1970

3,489,108
METHOD OF AND APPARATUS FOR SLUDGE DISPOSAL
David N. Garver, Twinsburg, Leonard A. Davis, Mayfield Heights, and Delbert F. Davis, Chesterland, Ohio, assignors to Garver-Davis Incorporated, Cleveland, Ohio, a corporation of Ohio
Filed Sept. 20, 1967, Ser. No. 669,187
Int. Cl. F23b 1/38, 1/28
U.S. Cl. 110—7                6 Claims

ABSTRACT OF THE DISCLOSURE

A method of and apparatus for thermally decomposing liquid waste material normally having some combustible constituents. The apparatus includes a high temperature retort which may be fired by a dual fuel burner.

BACKGROUND OF INVENTION

Large volumes of liquid industrial waste result from manufacturing and industrial operations today. Such waste comprises an appreciable to high percentage of water contaminated with such things as oils, solvents, coolants, cleaners, detergents, grease and the like. The problem of disposing of this waste is twofold; first, the waste must be disposed of without polluting our environment; and, second, the cost of such disposal must be economically feasible.

Most industrial plants whose operations give rise to such liquid waste presently employ some kind of water purification system. Such systems commonly use water clarifiers and waste particle thickeners together with settling tanks and skimmers for separating as much clean water as possible from the contaminants contained in the waste. In this manner, the gross amount of waste to be disposed of is reduced. None of these mechanical or chemical methods, however, completely solves the problem and there always remains a generally oily waste residue.

There are two general methods of handling this waste residue. One is to build a large lagoon or reservoir into which the residue is dumped and held. Its volume is gradually reduced through evaporation of water from it, leaving many of the contaminants to remain in more concentrated amounts. Another method is to hire scavenger haulers to remove the waste residue from holding tanks at the plant or from the plant reservoir. The scavenger hauler, in return, usually dumps it into another reservoir.

Both methods of disposing of the waste residue are expensive and really do not dispose of it. The problem is given further importance by the recent public concern about water pollution from industrial plants.

SUMMARY OF THE INVENTION

This invention relates to a method of and apparatus for disposing of industrial waste residue which normally contains combustible constituents by thermal decomposition of the material to smokeless and odorless hot flue gases and limited amounts of particulate material or ash.

The method comprehends the controlled release of smokeless and odorless flue gases from a confined high temperature environment into the atmosphere. The gases are released without draft-induced velocities and free of all air pollutants. In addition, the particulate material is removed from the released flue gases and collected and retained so that it is not carried into the air and over and about the surrounding area nor permitted to fall or otherwise be carried back into the burner section of the apparatus.

The apparatus comprises a longitudinally extending, cylindrically walled, hollow retort of refractory material. A burner element is mounted in one end and includes means for burning combustible mixtures of gaseous fuel and air to maintain the average temperature within the retort at a predetermined level great enough to thoroughly decompose all liquid waste introduced. The apparatus also comprises an air atomizing waste inlet nozzle for introducing the waste into the retort and atomizing it. At the opposite end of the retort from the burner is an open end directed toward a target wall. The retort is supported in a generally horizontal position.

A further aspect of this invention involves heating the retort partially by the B.t.u. content of combustible constituents of the waste material to be decomposed. More or less primary fuel is supplied to the burner in accordance with the amount of heat provided by the combustible constituents of the waste being treated. The proportions are maintained so that the temperature of the retort is, at all times during operation, at a predetermined average level. The level should be high enough to insure the reduction of the waste material introduced to smokeless and odorless flue gases.

The method and apparatus comprehended by this invention is highly useful in disposing of significant quantities of liquid industrial waste and thermally decomposing it to smokeless and odorless gases and a minimal amount of particulate matter or ash. The method and apparatus of this invention may be employed to dispose of the waste residue resulting from the normal water clarifying and waste particle thickening processes carried out in conventional water purification systems. The apparatus and method eliminate the need for waste reservoirs or lagoons and/or scavenger haulers to remove the waste residue from the plant or holding tank. In most cases, the money thus saved pays for the waste disposal apparatus in a few years. The apparatus is relatively small and compact, can be operated remotely with automatic controls and requires little attention from an operator.

BRIEF DESCRIPTION OF THE DRAWINGS

In the drawings, FIGURE 1 is a general perspective view of a preferred form of apparatus comprehended by this invention;

FIGURE 2 is a perspective view in enlarged scale of the burner end of the retort shown in FIGURE 1.

DESCRIPTION OF THE PREFERRED EMBODIMENT

Figure 3:
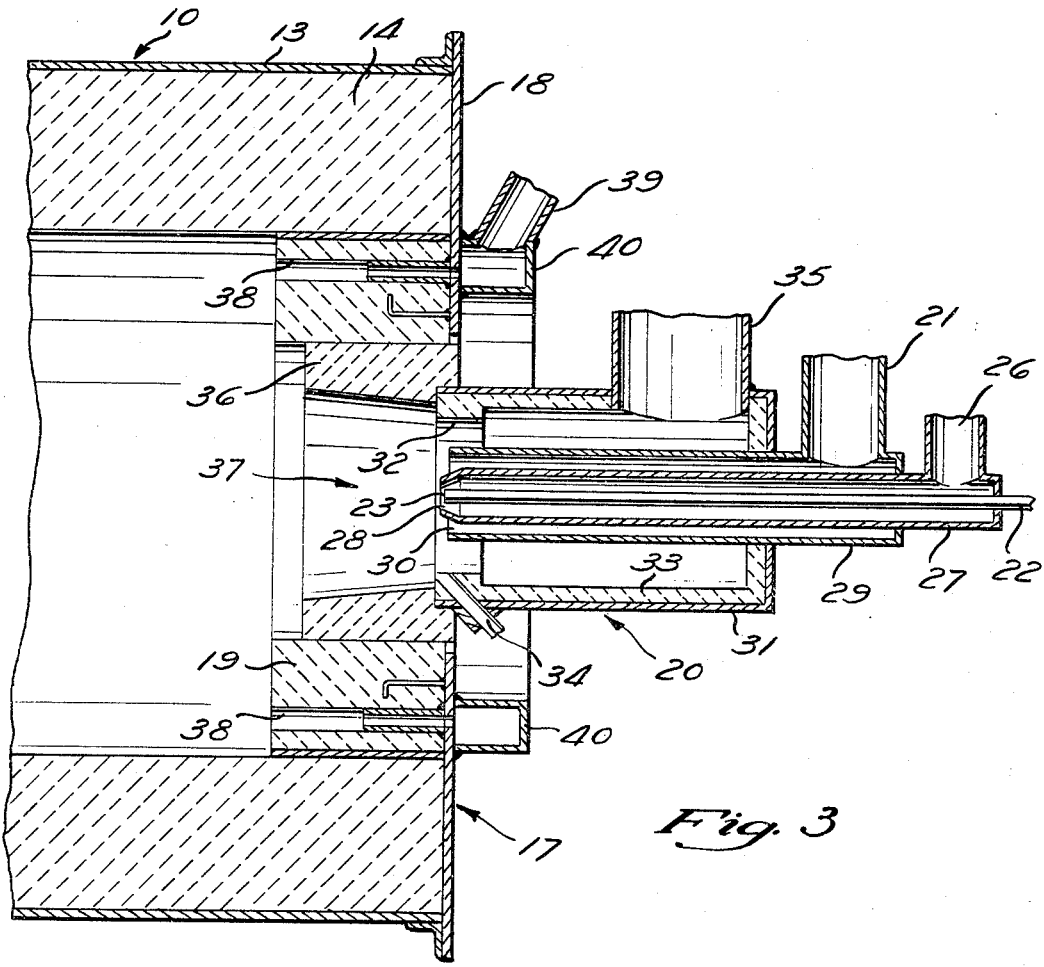
FIGURE 3 is a sectional elevation view through the burner end of the retort shown in FIGURES 1 and 2 taken in the plane of line 3—3 of FIGURE 1.

The apparatus of this invention comprises a longitudinally extending, cylindrically walled, hollow retort 10 supported with its axis generally horizontal on supporting stands 11. Supporting stands 11, as well as other elements of the apparatus, are preferably mounted together on a suitable base, such as concrete slab 12.

Retort 10 is preferably constructed with a cylindrical outer shell 13 lined with a thick layer of refractory material 14. In a successful form of this invention, the retort is approximately twelve feet long, four and one-half feet in outside diameter, and the refractory layer is about ten inches thick radially, leaving about a two and one-half foot diameter hollow interior chamber. The refractory is able to withstand temperatures well in excess of 2000° F.

The exhaust end 15 of retort 10 is free and open to the atmosphere. The burner end 16 is closed by an end wall indicated generally at 17. End wall 17 is preferably made up of a circular plate 18 adapted to cover the end of retort 10 and to be fastened by suitable means to the outer shell 13. The inner face of plate 18 is lined with a thick layer of refractory material 19 similar to lining 14.

A burner element indicated generally at 20 is centrally mounted in end wall 17. Burner element 20 is preferably a dual fuel burner adapted to burn natural or propane gas and the combustible constituents of liquid waste being treated. The gaseous fuel is supplied to burner element 20 through a conventional gas line 21 under the conventional control of normal and accepted safety devices and pressure regulators which themselves form no part of this invention. In addition, the gas supply is under control of automatic devices responsive to retort temperature in a manner to be described below.

Preferably, the liquid waste to be disposed of is collected in a collecting tank (not shown) provided within a reasonable distance of the retort and burner to insure a continuous supply of waste to the burner during its operation. While the material is in this collecting tank, it is agitated to keep the collected waste material in a homogenous condition. From the collecting tank, the waste is pumped through waste line 22 to burner 20 where it is ejected from a nozzle 23 into retort 10.

A single blower 24 supplies the primary air for initial combustion of the fuels, the secondary air for accomplishing complete combustion, and the air necessary to atomize the waste material introduced. As shown in FIGURES 1 and 2, the outlet of blower 24 is connected to a manifold 25 extending upwardly and across the top of the burner end 16 of the apparatus. An atomizing air line 26 is tapped off manifold 25 and connected to a cylindrical casing 27 surrounding waste line nozzle 23 and forming an annular opening 28 with it at the nozzle outlet. Atomizing air is introduced in a manner to insure good atomization of the waste material issuing from the outlet of waste line nozzle 23.

As seen in FIGURE 3, gas line 21 is connected into a casing 29 of larger diameter than and surrounding atomizing air casing 27 so that an annular space is provided between casings 27 and 29. Casing 29 terminates in an annular opening 30 surrounding and generally concentric with atomizing air outlet 28 and the outlet of waste line nozzle 23.

Surrounding the concentric arrangement of waste line nozzle 23, atomizing air and gas casings 27 and 29 is a primary air casing 31 having an annular opening 32 surrounding gas casing 29. Primary air casing 31 is preferably lined with refractory material indicated at 33. A pilot line inlet 34 may be conveniently located through the wall of primary air casing 31 to supply a sufficient amount of gaseous fuel and air mixture to the burner for pilot purposes. Primary air is supplied to casing 31 by conduit 35 tapped off air manifold 21. The outlet end of primary air casing 31 opens into and is supported by an annulus 36 of refractory material providing a conical combustion zone indicated generally at 37. Annulus 36 is supported in a circular opening in the end wall 17.

A number of air passages 38 are located in a circular arrangement about the refractory material of the burner end wall. Air is supplied to the secondary air passages by means of a secondary air conduit 39 tapped off air manifold 25 and connected to an annular distribution chamber 40 mounted on the outside of end plate 18.

A target wall 41 is located adjacent to and axially spaced from the open exhaust end 15 of retort 10 and is preferably movable toward and away from it. Target wall 41 is preferably composed of refractory material such as bricks or blocks supported by a steel framework. The surface of target wall 41 facing the open end of retort 10 is perferably normal to the axis of the retort.

In operation, the lining and atmosphere within the retort is brought up to operating temperature by operating the burner as a gas-fired unit. A retort operated at 2000° F. has successfully thermally decomposed ordinary industrial liquid waste comprised of water, oil, solvents, water clarifiers, and waste particle thickeners, coolants and the like, and reduced it to smokeless and odorless flue gases and small amounts of particulate material.

When the desired retort temperature has been reached and stabilized, waste materials are introduced into retort 10 through waste line 22 and nozzle 23. The waste material is atomized directly into combustion zone 37 by atomizing air introduced through atomizing air casing 27. The waste material is thermally decomposed and consumed within the retort and leaves it in the form of smokeless and odorless flue gases which issue from the exhaust end 15 of the retort.

The flue gases leave retort 10 with considerable velocity and impinge directly upon target wall 41 where they are diverted, deflected and slowed down. The flue gases are then free to enter the atmosphere without any smoke, odor, or air pollutants. Any particulate material or ash contained in the flue gases leaving exhaust end 15 of retort 10 also strikes target wall 41. Substantially all of this particulate matter falls out of the flue gases and is deposited at the base of the target wall once the velocity of the particles and flue gases carrying them has been reduced. Target wall 41 also serves to control the back pressure on retort 10 and the temperatures maintained therein. Varying conditions, rates of feed, and types of waste material to be disposed of can easily be accommodated by moving the target wall 41 away from and toward the exhaust end 15 of the retort.

It is important that retort 10 be located in a substantially horizontal position so that there are no draft-induced flue gas velocities established and directed upwardly and outwardly into the atmosphere. Such draft-induced velocities are undesirable because they tend to carry particulate matter and ash into the air and spread it around and drop it over a wide area as the velocities of the flue gases bearing them decrease and are no longer able to support the weight of the matter.

A further important advantage of the horizontal arrangement of the retort is that the exhaust end of the device is located as far as possible from the burner and the control elements relating thereto. In addition, this arrangement tends to prevent particulate matter resulting from the thermal decomposition of the waste material from falling back into or otherwise becoming deposited on and in the burner element and the various fuel and air outlets entering therein.

The horizontal arrangement of the retort 10 also keeps the retort and all its associated equipment and mechanisms close to the ground, contributing to the ease of its maintenance and operation. The device can be contained in a relatively small area and can easily be housed, if desired, in a small isolated building or shelter. For example, a device embodying this invention and which is able to easily reduce and dispose of one hundred gallons per hour of oily waste liquid has an overall length of about sixteen feet. The retaort is approximately thirteen feet long and four and one-half feet in outside diameter. The entire device, comprising retort, burner, blower including motor and manifold, target wall, and automatic controls, fits on a concrete pad approximately fifteen feet by twenty or twenty-five feet.

It will be noted that the dual fuel burner element 20 described in detail above permits the burning of the combustible constitiuents of the waste products being treated. The dual fuel burner preferably is operated by metering the amount of gas supplied so that its B.t.u. content, augmented by the B.t.u. content of the combustible constituents of the liquid waste, is sufficient to maintain the average temperature in the retort at the desired level. By means of conventional controls, this manner of operation can be automatically controlled so that, as the combustible constituent content of the waste being treated changes, for example, greater or lesser amounts of gas are supplied to the burner and the temperature in the retort is maintained at a predetermined level.

Those skilled in the art will appreciate that various changes and modifications can be made in the apparatus described herein without departing from the spirit and scope of the invention.

We claim:
1. Apparatus for disposing of liquid wastes comprising
a longitudinally extending, cylindrically walled, hollow retort of refractory material and having an axis, a burner end closed by an end wall and an open exhaust end axially remote from said burner end, said retort being supported with its axis substantially horizontal,
a dual fuel burner element having means for burning two fuels, one of which is liquid waste having combustible constituents, said burner element being mounted in the burner end of said retort centrally of said end wall for burning combustible mixtures of air and fuels supplied thereto to maintain the average temperature within said retort at a predetermined level great enough to thermally decompose liquid waste introduced therein,
means for supplying liquid waste having combustible constituents to said burner element to be thermally decomposed in said apparatus,
means for supplying a second fuel separately from said waste to said burner element for combustion in said apparatus,
a target wall axially spaced from the exhaust end and generally normal to the axis of said retort for stopping the further forward progress and escape out of the exhaust end of said retort of particulate matter remaining from the thermal decomposition of waste liquid within said retort while deflecting and permitting the escape to atmosphere of the flue gases from the exhaust end of said retort free of particulate matter.

2. Apparatus according to claim 1 in which said means for supplying the liquid waste comprises an air atomizing nozzle having an outlet for ejecting liquid waste axially of said retort and means to supply atomizing air and liquid waste thereto, said nozzle being substantially in the center of said burner element, and in which said means for supplying a second fuel comprises an annular gaseous fuel supply opening concentric with and around said nozzle outlet.

3. Apparatus according to claim 2 in which said burner element further comprises an annular primary air supply opening concentric with and surrounding said gaseous fuel supply opening.

4. Apparatus according to claim 3 in which said burner element further comprises a circularly arranged plurality of secondary air supply passages concentric with and about and spaced radially outwardly from said annular primary air supply opening.

5. Apparatus according to claim 1 in which said target wall is movable toward and away from the exhaust end of said retort to permit control of the escape velocity of flue gases from said retort and capture of particulate matter contained therein.

6. Apparatus according to claim 1 in which said retort is supported in a position inclined away from vertical enough to substantially prevent upwardly directed, draft-induced velocities in the flue gases escaping from the exhaust end of said retort.

References Cited

UNITED STATES PATENTS

| | | | |
|---|---|---|---|
| 3,244,220 | 4/1966 | Kloecker. | |
| 3,345,960 | 10/1967 | Maurice et al. | 110—8 |
| 3,357,375 | 12/1967 | Brophy. | |
| 3,395,654 | 8/1968 | Weisberg et al. | 110—8 |

KENNETH W. SPRAGUE, Primary Examiner